Patented May 29, 1934

1,961,065

UNITED STATES PATENT OFFICE 1,961,065

METHOD OF RECOVERING TIN FROM RESIDUES

Thomas A. Mitchell, Denver, Colo., assignor to Lafayette M. Hughes, Denver, Colo.

No Drawing. Application May 25, 1931,
Serial No. 539,821

14 Claims. (Cl. 75—67)

This invention relates to a method of recovering tin from a tin bearing material, and more particularly to a method of converting the tin compound in such a material to a condition in which it may be readily treated by reagents, such as chlorine, whereby it may be separated from the undesired residue.

Tin is commonly found in nature as casseiterite, a crystallized dioxide, and associated with various other materials, and the present day smelting methods of treating tin ores often result in a residue containing a high percentage of tin along with iron and various inert materials making up the gangue of the ore. Many schemes have been tried for separating the tin from the iron and other undesired materials, but each has presented its problems.

It is one object of this invention to provide a method of recovering tin from a tin bearing residue containing iron and other inert materials in which these undesired elements are employed as aids to insure an efficient recovery of the tin.

A further object of this invention is to so prepare the tin bearing material that it may be easily chlorinated whether or not undesired materials are present.

With these and other objects in view, as will be apparent to one skilled in the art, this invention resides in the combination of process steps set forth in the specification and covered by the claims appended hereto.

In accordance with this invention, it is proposed to make use of the iron which may be present as an impurity in a tin bearing material or added for the purpose so as to make a tin iron alloy with all of the tin. The inert materials which may represent the ore gangue are likewise employed in this process in order to aid in making the mass open, porous and granular or pulverulent in form so that the tin may be readily attacked by reagents and extracted from the residue. To this end I propose to so treat the tin bearing material in the presence of an iron compound and inert materials that the tin and iron compounds are reduced to the metallic state and form a tin iron alloy. The alloy is kept in a granular form and the particles are not permitted to coalesce and fuse together into a large solid mass. This condition is aided by the presence of the various inert materials which are intermingled with the metal particles. Hence, the material thus reduced to a tin iron alloy is in a granular condition having an extensive exposed surface so that it may be readily treated by a leaching agent or by such chloridizing agents as chlorine gas. A further feature of this invention involves chloridizing the tin-iron alloy under such conditions that the iron will not be chloridized. This is preferably accomplished by carrying on the final step of the chloridizing operation in the presence of air and at a temperature at which any iron chloride which may have been formed will not be stable but will be converted to ferric oxide, with a resultant release of its combined chlorine in the nascent condition.

As a specific example illustrating the invention, I may treat a tin bearing residue comprising tin oxide, ferric oxide, and various inert materials, such as quartz, complex silicates and alkaline earth materials or other substances commonly associated with a tin bearing ore or added to aid in the process of recovering values therefrom. It is desired that there be sufficient iron present to alloy with all of the tin, hence if the ferric oxide content is low, there may be added more of this material or other iron bearing compounds suitable for the purpose. Likewise, if the inert material is not present in sufficient quantity, a further amount may be incorporated so as to insure that when the tin and iron are reduced to the alloyed form, they will be separatd by the inert particles and be compelled to remain as small granules and not be permitted to run together into a large fused mass.

A mixture of these materials is granulated or ground to a pulverulent condition, if not already in that form, and then subjected to a reducing treatment to form a tin iron alloy. For this purpose I preferably utilize a reducing gas of which many types may be used, such as hydrogen gas, or gases containing carbon monoxide, or hydrocarbons such as water gas, producer gas, illuminating gas, or gases derived from burning oils or similar materials as will be well understood by those skilled in this art. This reduction is carried on in a suitable apparatus such as an inclined rotary tubular kiln having suitable stirring devices incorporated in its structure. Hence, as the kiln rotates, the particles of tin bearing material intermingled with the iron compound and the inerts, all in powdered form, will be showered through the reducing gas as they pass in counterflow relation thereto and be readily attacked thereby. The temperature range will be maintained sufficiently low so that the inert materials will not be sintered or fused to a slagged condition, but of course the temperature will be high enough to cause the reduction of the tin and the iron oxides to the metallic condition. Ordinarily, I employ a temperature ranging between 600° and 900° C. Under such a temperature condition and particularly because of the granular material being constantly agitated in the rotating kiln, the charge does not become sintered or fused to a vitreous mass but is kept in a pulverulent state. Such materials as quartz, the metal silicates found in the rock gangue and calcium or other metal compounds commonly found in nature, which may have been present in the ore material or added thereto to aid in recovering values from the ore, will remain substantially inert or be reduced to materials which will not affect the process detrimentally. Hence, these infusible particles separate the tin and iron bearing particles and force them to develop into small grains containing the tin iron alloy without giving them a chance to melt together into larger masses.

The next stage of this process involves the separation of the tin from this alloy as well as from the inert materials intermingled therewith. It is preferred to convert the tin to a chloride, and for this purpose the granular material containing the alloy is treated in a suitable chamber with chlorine gas and preferably while it is being agitated and under such controlled temperature conditions that the tin is changed to stannic chloride. The temperature of this reaction chamber is maintained sufficiently high to cause the stannic chloride to volatilize, which takes place at 114° C. It is also desirable that the temperature be maintained above the point at which ferric chloride is stable and in some cases as high as 300° C. This operation is preferably accomplished in a rotary tube such as is employed for the reducing operation in which suitable baffles or stirring apparatus within the rotary tube are arranged to keep the material agitated and in full contact with the chlorine gas which is preferably passed in counterflow relation thereto. A supply of oxygen is maintained in order to convert the iron to ferric oxide or so that any ferric chloride which may be initially formed at the cooler entrance end of the tube will not be stable but in the oxidizing atmosphere will be converted to ferric oxide and result in the formation of nascent chlorine. This chlorine, being in very intimate contact with the alloy particles, will readily attack the tin and aid materially in forming stannic chloride. Since such iron chloride as may be formed temporarily at the lower temperature of the entrance end of the apparatus is decomposed at the hotter end before the material leaves the chloridizing zone, the process may be considered as one which prevents the chloridization of the iron, with a consequent saving of chlorine and the retention of the iron with the gangue as iron oxide with or without some metallic iron which remained unchloridized.

The tin chloride may be recovered in various ways such as by means of a condenser system. One preferred manner of treating these tin chloride fumes is to pass them into contact with water and thus form a solution of the tin chloride. This may be accomplished in a leaching tower in which water is caused to flow from one to another of a series of horizontal trays so as to present an extensive surface to the chloride fumes. As a result, the tin chloride is dissolved in the water. This tin chloride solution may be easily recovered by suitable methods and converted into metallic tin or otherwise treated as desired. For example, it may be passed over spongy zinc to produce spongy tin and zinc chloride and the tin may be then melted to form a high grade block tin while the zinc chloride may be suitably recovered for other uses.

It will now be apparent that this invention involves forming a granulated or very porous or spongy tin iron alloy, which may be readily treated by the subsequent chloridizing agent. Therefore, this invention applies to other materials besides the tin and iron oxide bearing material above mentioned. It may be employed for treating a mixture of tin oxide and iron oxide in granular form, but without the aid of the inert material. In that case, a constant agitation of the particles during the reducing operation serves to keep the mass granular, provided the temperature and rate of agitation during the operation are carefully controlled.

The invention may also be utilized for recovering tin from such materials as hard head, which is formed in the process of smelting a tin bearing ore. This hard head represents a cut between the pure tin and the slag coming from the smelter and consists of an alloy of tin and iron containing a high proportion of iron. The ordinary treatment for this hard head heretofore has been to return it with the next batch to the smelter, thus involving expense and loss of efficiency in the treatment of such tin bearing ores. It is within the scope of this invention to treat this hard head in such a manner as to make it granular or porous so that it may be readily chlorinated.

One simple way of thus treating the hard head is to melt it and then to granulate it. This may be accomplished by pouring the molten tin iron alloy into water or through a stream of cooling water or a blast of air or other gaseous material adapted for the purpose, which causes the alloy to assume a granular or finely divided condition and one in which it presents a large and extensive surface. This granulated material in its finely divided condition of globules or fragments of extensive surface is thus in suitable condition for the subsequent chloridizing treatment, but if the surface extent is not sufficient, it will be understood that the material may be further pulverized if desired. Thereafter it is treated with chlorine gas in the manner above described to form stannic chloride and leave iron oxide or metallic iron.

It will now be understood that this invention has many applications to various types of tin bearing materials which may be either ores containing tin in a compound which may be readily reduced or which may consist of residues from other processes. The process will be suitably modified, as will be understood by one skilled in the art, to take care of the particular material selected for treatment. It will be understood that the term "inert materials" has been used herein to cover such substances are are not converted to a metal by the reducing gas and so do not alloy with the tin or otherwise detrimentally affect the formation of the tin-iron alloy.

Having thus described my invention, what I claim as new and desire to secure by Letters Patent is:

1. The method of treating a material containing tin and iron comprising the steps of forming an alloy of all of the tin with iron in an open, porous or granular condition, thereafter treating the granular alloy with chlorine gas and oxygen in excess of the iron requirements at a temperature above 114° C. at which stannic chloride is volatile and ferric chloride dissociates, thereby forming a volatile stannic chloride and ferric oxide from said alloy, and separating the volatile chloride from the iron-bearing residue.

2. The method of treating a material containing tin and iron oxides comprising the steps of reducing the oxides while agitating the mass and maintaining conditions which cause the formation of a tin iron alloy having a granular condition and an extensive surface thereafter treating the mass with chlorine and oxygen at a temperature at which ferric chloride is not stable and stannic chloride is volatilized, and causing the production of stannic chloride and ferric oxide, and separating the volatilized stannic chloride from the iron-bearing residue.

3. The method of treating a metallurgical material containing tin oxide and inert materials comprising the steps of insuring the presence of sufficient iron oxide calculated to form an iron alloy with all the tin, subjecting the mass to a reducing operation while agitating it and causing the formation of granules of tin-iron alloy having extensive surfaces interspersed with granules of inert material and thereafter chlorinating the mass under oxidizing and high temperature conditions which produce and volatilize stannic chloride and leave the iron as ferric oxide.

4. The method of treating a complex material containing tin and iron compounds and inert materials comprising the steps of providing iron in amount calculated to alloy with all of the tin, granulating the material, subjecting it to a reducing treatment while agitating it so as to produce a granular mass containing particles of a tin-iron alloy interspersed with inert particles, thereafter chlorinating the material with chlorine and oxygen at a temperature sufficiently high to form volatile stannic chloride and leaving the iron in a non-chloridized condition with the inerts, and recovering a tin compound therefrom.

5. The method of treating a material containing tin and iron oxides and inert materials comprising the steps of insuring the presence of sufficient iron to alloy with all of the tin and a considerable quantity of inert materials, granulating the mixture, subjecting it to the action of a reducing gas at a temperature sufficient to form a tin-iron alloy but without melting or sintering the material, continuously agitating the material during the reducing operation and thereby forming a granular mass having particles containing a tin-iron alloy interspersed with inert granules, then subjecting the granular material to the action of chlorine gas to form the chloride and heating the material under oxidizing conditions and to a temperature at which ferric chloride is not stable.

6. The method of treating a material containing tin oxide comprising the steps of providing a mixture containing iron oxide proportioned to form an iron alloy with all of the tin, subjecting the material in a finely divided condition and interspersed with inert substances to the action of a reducing gas at a temperature sufficient to form a tin-iron alloy, but without melting or sintering the material, thereby forming a granular mass having particles containing a tin-iron alloy interspersed with inert granules, then subjecting the granular material to the action of chlorine and oxygen gas at a temperature sufficient to produce a volatilized stannic chloride and leave the iron as ferric oxide, passing said volatilized stannic chloride into contact with water to dissolve it and recovering the same.

7. The method of treating an ore material containing tin and iron oxides and the gangue comprising the steps of pulverizing the ore material to a granular condition and insuring that there is sufficient iron oxide present to form a tin-iron alloy with all of the tin, subjecting the granular material to a reducing operation under low temperature conditions and while continuously agitating it so as to reduce both of the tin and iron oxides and form an alloy of said metals, said temperature being sufficiently low to minimize the formation of slag or the sintering of the ore materials and to insure that the gangue remains granular and prevents the coalescence of the particles of the tin-iron alloy into large masses, thereby forming a granular product containing the tin-iron alloy which is readily permeated by chemical reagents, thereafter treating the material with chlorine to convert the tin of said alloy to a chloride and heating the ore material with air to a temperature at which iron chloride is decomposed and thereby preventing the iron from being chloridized, and separating the tin from the iron and gangue content of the ore.

8. The method of treating an ore material containing tin and iron oxides comprising the steps of claim 7 for providing a granular mass in which a tin-iron alloy is present in particles of extensive surface, and then treating the alloy with chlorine gas and oxygen in excess and heating the material to a temperature at which ferric chloride is not stable and causing the formation of ferric oxide and the volatilization of stannic chloride.

9. The method of treating a non-porous mass containing a tin-iron alloy which is not permeable to gases, comprising the steps of melting the alloy and granulating it to form particles of extensive surface, and thereafter treating the alloy with chlorine gas and oxygen and heating the material to a temperature at which ferric chloride is not stable and causing the formation of ferric oxide and the volatilization of stannic chloride and thereby separating the tin from the iron.

10. The method of recovering tin from a complex ore material containing tin oxide comprising the steps of insuring the presence of sufficient iron oxide calculated to form a tin-iron alloy with all of the tin and providing sufficient inert gangue material to insure the formation of a granular alloy, producing a finely divided mixture of the ore materials and gangue, agitating the mixture while treating it with reducing gases at a temperature which causes the tin and iron to be reduced to a metallic condition and in the form of small granules containing a tin-iron alloy, which are intimately interspersed with and separated by the particles of the gangue, and thereafter treating the mixture with chlorine gas and oxygen in excess at a temperature at which ferric chloride is not stable in the presence of oxygen, thereby forming stannic chloride and ferric oxide, and heating the material to volatilize the stannic chloride, and separating it from the ferric oxide and the gangue.

11. In combination with the smelting of a tin and iron ore in which an alloy of tin and iron is produced, the method of separating the tin from the iron comprising the steps of melting the alloy and passing the same through a cooling fluid to produce a granular material having an extensive surface, thereafter treating said material with chlorine gas and with oxygen in excess of the iron requirements while heating the material to a temperature above that at which stannic chloride volatilizes and iron chloride is not stable in the presence of oxygen, and thereby producing volatilized stannic chloride while preventing the formation of iron chloride, and separating the volatilized chloride from the iron-bearing residue.

12. The method of treating an ore material containing tin and iron oxides and gangue comprising the steps of pulverizing the ore material to a finely divided condition, subjecting the material to a reducing operation under low temperature conditions and while continuously agitating it so as to reduce both the tin and the iron to the metallic form, the temperature being sufficiently low to minimize the formation of slag or the sintering of the ore material and to insure that the gangue remains granular and prevents the coalescence of the metal particles into large masses, thereby forming a product which is readily permeated by chemical reagents, thereafter treating the powdered material with chlorine gas to convert the tin to stannic chloride and heating the material with air to a temperature at which the iron chlorides are not stable and thereby preventing the chloridization of the iron, and separating the tin from the tin and gangue content of the ore.

13. The method of chloridizing the tin in a material containing metallic tin and iron comprising the steps of treating the material in a finely divided condition with chlorine gas to convert the tin to stannic chloride, heating the material with air to a temperature at which any iron chloride present is not stable but is converted to nascent chlorine and ferric oxide, and thereby preventing chloridization of the iron, and causing the stannic chloride to be volatilized and separated from the iron-bearing residue, and thereafter recovering the volatilized tin chloride.

14. The method of chloridizing tin in an ore material containing metallic tin and iron comprising the steps of treating the ore material in a finely divided condition with chlorine gas passed in counterflow relation thereover and converting the tin to stannic chloride, treating the material with air at a temperature at which the stannic chloride is volatilized and any iron chloride present is converted to ferric oxide and nascent chlorine is formed in reactive association with the material, and thereby preventing chloridization of the iron and causing the chloridizing agents present or formed to be absorbed in the incoming ore material and the volatilized stannic chloride to be separated from the iron-bearing residue.

THOMAS A. MITCHELL.

CERTIFICATE OF CORRECTION.

Patent No. 1,961,065.  May 29, 1934.

THOMAS A. MITCHELL.

It is hereby certified that error appears in the printed specification of the above numbered patent requiring correction as follows: Page 1, line 8, for "casseiterite" read casseterite; and line 81, for "separatd" read separated; page 2, line 136, for "are" first occurrence, read as; page 3, line 9, claim 2, after "surface" insert a comma; and line 54, claim 5, for "the" read tin; and that the said Letters Patent should be read with these corrections therein that the same may conform to the record of the case in the Patent Office.

Signed and sealed this 24th day of July, A. D. 1934.

Bryan M. Battey (Seal)  Acting Commissioner of Patents.